Figure 1:
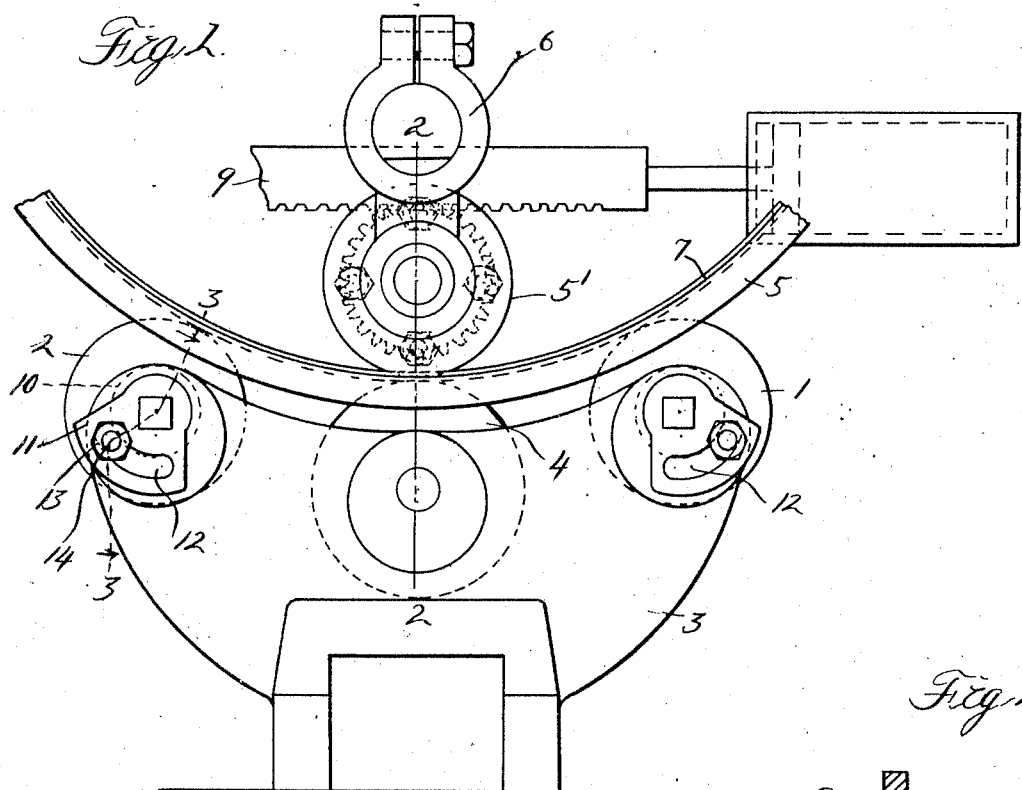

April 16, 1929.  W. N. BOOTH  1,709,002

MACHINE FOR CLOSING AND STAMPING RIMS

Filed June 14, 1926

Inventor
William N. Booth

By

Attorneys

Patented Apr. 16, 1929.

1,709,002

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

MACHINE FOR CLOSING AND STAMPING RIMS.

Application filed June 14, 1926. Serial No. 115,937.

The invention relates to machines for closing and stamping rims and is designed particularly for transversely split demountable tire carrying rims. One of the objects of the invention is to provide a machine for closing a transversely split rim. Another object is to provide a machine for stamping the rim with suitable characters, such as the name of the manufacturer and for using the stamp as a means for setting the rim. Further objects of the invention reside in the novel features of construction and combinations and arrangements of parts as more fully hereinafter set forth.

In the drawings:—

Figure 3:
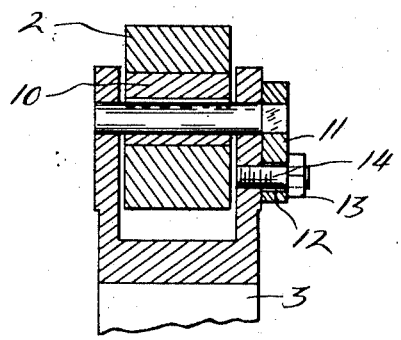
Figure 2:
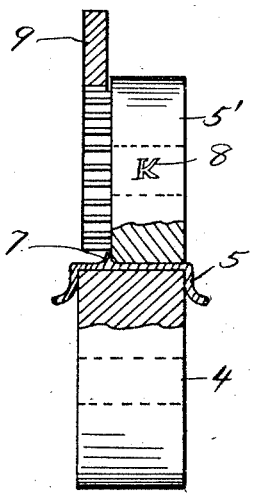

Figure 1 is a front elevation of a machine embodying my invention;

Figures 2 and 3 are cross sections on the lines 2—2 and 3—3 of Figure 1.

As shown in the present instance, the machine is designed to simultaneously stamp and close a demountable transversely split tire carrying rim. In the commercial manufacture of rims of this nature the ends of each rim may be and usually are spaced from each other after they have been form-rolled, and as a consequence, the rim must be closed by bringing its ends against each other and set with the ends in this position. This has been done usually by peening the inner surface of the base of the rim with a hammer.

In detail, my machine has the laterally spaced rolls 1 and 2 which are rotatably mounted upon the bed 3 of the machine. Intermediate these rolls is the roll 4, which is also rotatably mounted upon the bed. These three rolls have a contour corresponding to the contour of the outer surface of the base of the demountable transversely split tire carrying rim 5 and are positioned upon the bed substantially concentric with the rim. The outer rolls 1 and 2, however, are positioned with respect to the intermediate roll 4 so that the radius of the arc connecting the surfaces of these rolls in contact with the rim is slightly less than the radius of the rim. 5 is a roll journaled upon the machine horn 6 vertically above the intermediate roll 4 and having a contour to fit the inner surface of the base of the rim preferably at the inner side of the bead 7 upon this base. The surface of this roll is provided with suitable characters 8 which extend radially outward from the main portion of the surface to form in effect a stamp for designating the name of the manufacturer or other desired data. The roll 5 is preferably power driven as by means of the reciprocable rack 9 and the bed 3 is adapted to be raised and lowered to move the base of the rim into or out of engagement with the stamping roll.

In operation, a rim is placed in the machine with its split spaced above the series of rolls upon the bed. The bed is then raised to force the base of the rim against the stamping roll which when rotated stamps the rim base. During this operation, the ends of the rim are moved toward each other and the projecting characters upon the roll 5, in addition to stamping the base, peen the same to set the rim with its ends in adjusted position. The stamping operation, as set forth above produces a plurality of impressions in the inner surface of the rim which serves to hold or set the rim in the position as rolled. If however the ends of the rim are not in contact the rim is peripherally adjusted relative to the rolls and again stamped, these operations continuing until the ends of the rim are in contact.

For the purpose of adapting the machine to take care of various diameters of rims, the rolls 1 and 2 and preferably the roll 4 are journaled upon the eccentrics 10, as shown particularly in Figure 3, which eccentrics are journaled in the machine bed and are rotatably adjustable. For holding these eccentrics in their various positions of rotative adjustment, I have provided the front ends of the eccentrics with the heads 11, which have the arcuate slots 12 therein concentric with the axes of those portions of the eccentrics journaled in the bed. 13 are nuts threadedly engaging the studs 14 secured in and extending transversely of the bed and through the arcuate slots of the heads, the nuts being adapted to clamp the heads against the bed.

From the above description, it will be readily seen that I have provided a machine for simultaneously stamping and closing a transversely split rim. It will also be seen that this machine, in addition to stamping the rim, peens the same so that its ends will remain against each other. Furthermore, it will be seen that my machine is adjustable to take care of various diameters of transversely split rims.

What I claim as my invention is:

1. In a machine for closing and stamping transversely split rims, the combination of members eccentrically mounted with respect to a rim and engageable with the outer surface of the rim at peripherally spaced points and a member engageable with the inner surface of the rim at a point intermediate said first-mentioned members for simultaneously stamping the rim and peening the same to hold its ends in close proximity.

2. In a machine for closing and stamping transversely split rims, the combination of members eccentrically mounted with respect to a rim and engageable with the outer surface of the rim at peripherially spaced points and a rotatable member engageable with the inner surface of the rim at a point intermediate said first-mentioned members, said last mentioned member being provided with projections upon its surface for simultaneously stamping the rim and peening the same to hold its ends in close proximity.

3. In a machine for closing and stamping transversely split rims having a bed, the combination of rolls eccentrically mounted upon the bed and engageable with the outer surface of the rim at peripherally spaced points and a roll engageable with the inner surface of the rim at a point intermediate said first-mentioned rolls for simultaneously stamping the rim and peening the same to hold its ends in close proximity.

4. In a machine for closing and stamping transversely split rims, the combination of laterally spaced rolls engageable with the outer surface of a rim at peripherally spaced points, an intermediate roll also engageable with the outer surface of the rim, a stamping roll engageable with the inner surface of the rim opposite said intermediate roll for simultaneously stamping the rim and peening the same to hold its ends in close proximity, and means for actuating the stamping roll including a gear, and a reciprocable rack engageable with said gear.

5. In a machine for operating upon transversely split rims, the combination of rolls engageable with the outer surface of the base of a rim at peripherally spaced points, a rotatable roll engageable with the inner surface of the base of the rim at a point intermediate said first-mentioned rolls for closing the rim, and means upon said last-mentioned roll for peening the base of the rim to hold the latter in closed position.

6. In a machine for operating upon transversely split rims, the combination of members engageable with the outer surface of the base of a rim at peripherally spaced points, a member engageable with the inner surface of the base of the rim at a point intermediate said first-mentioned members for closing the rim, and means including an eccentric mounting for one of said first-mentioned members for adjusting the same relative to the rim.

7. In a machine for stamping and closing transversely split rims having a bed, the combination of eccentrics journalled in the bed, rolls journalled on said eccentrics and engageable with the outer surface of a rim at peripherally spaced points, means for adjusting said eccentrics to move said rolls relative to the rim, and a roll engageable with the inner surface of the rim at a point intermediate said first mentioned rolls for simultaneously stamping and peening the same to hold its ends in close proximity.

8. In a machine for closing and stamping transversely split rims having a bed, the combination of laterally spaced rolls engageable with the outer surface of a rim at peripherally spaced points, an intermediate roll also engageable with the outer surface of the rim, means including an eccentric mounting for each of said rolls for adjusting the same relative to said rim and a stamping roll engageable with the inner face of the rim opposite said intermediate roll for simultaneously stamping the rim and peening the same to hold its ends in close proximity.

9. In a machine for closing and stamping transversely split rims, the combination of laterally spaced rolls engageable with the outer surface of a rim at peripherally spaced points, an intermediate roll also engageable with the outer surface of the rim, said first mentioned rolls being so positioned with respect to the intermediate roll that the radius of the arc connecting the surfaces of the said rolls in contact with the rim is slightly less than the radius of the rim, and a stamping roll engageable with the inner surface of the rim opposite said intermediate roll for simultaneously stamping the rim and peening the same to hold its ends in close proximity.

10. In a machine for closing and stamping transversely split rims, the combination of means engageable with the rim for closing the same and means also engageable with the rim for stamping the rim and peening the same to hold its ends in close proximity.

11. In a machine for closing and stamping transversely split rims, the combination of members engageable with the outer surface of the rim at peripherally spaced points, and a member having projecting characters thereon engageable with the rim for simultaneously stamping the rim and peening the same to hold its ends in close proximity.

In testimony whereof I affix my signature.

WILLIAM N. BOOTH.